United States Patent
Buckingham et al.

(10) Patent No.: US 11,580,442 B2
(45) Date of Patent: Feb. 14, 2023

(54) MACHINE LEARNING MODEL SCORE OBFUSCATION USING TIME-BASED SCORE OSCILLATIONS

(71) Applicant: Cylance Inc., Irvine, CA (US)

(72) Inventors: Hailey Buckingham, Vancouver, WA (US); David N. Beveridge, Portland, OR (US)

(73) Assignee: Cylance Inc., San Ramon, CA (US)

( * ) Notice: Subject to any disclaimer, the term of this patent is extended or adjusted under 35 U.S.C. 154(b) by 929 days.

(21) Appl. No.: 16/399,718

(22) Filed: Apr. 30, 2019

(65) Prior Publication Data

US 2020/0349462 A1 Nov. 5, 2020

(51) Int. Cl.
*G06F 21/55* (2013.01)
*G06N 20/00* (2019.01)

(52) U.S. Cl.
CPC ............ *G06N 20/00* (2019.01); *G06F 21/554* (2013.01); *G06F 2221/032* (2013.01)

(58) Field of Classification Search
CPC ............ G06F 21/554; G06F 2221/032; G06F 21/629; G06F 21/75; G06N 20/00
See application file for complete search history.

(56) References Cited

U.S. PATENT DOCUMENTS

| | | | |
|---|---|---|---|
| 9,516,053 B1* | 12/2016 | Muddu | H04L 43/00 |
| 9,690,938 B1* | 6/2017 | Saxe | G06N 20/00 |
| 10,379,995 B1* | 8/2019 | Walters | G06V 10/768 |
| 2018/0314835 A1* | 11/2018 | Dodson | G06F 21/552 |
| 2019/0095629 A1* | 3/2019 | Lee | G06Q 10/06 |
| 2019/0260775 A1* | 8/2019 | Bartos | G06F 21/564 |
| 2020/0169618 A1* | 5/2020 | Yamane | H04L 67/2828 |
| 2020/0204412 A1* | 6/2020 | Fompeyrine | H04L 27/001 |
| 2021/0241175 A1* | 8/2021 | Harang | G06N 5/003 |

OTHER PUBLICATIONS

"Managing quarantined and trusted items" https://download.mcafee.com/products/webhelp/4/1033/GUID-479F589F-DFB5-45B3-8306-6A9E5F2F9941.html (1 page) (Year: 2011).*

* cited by examiner

*Primary Examiner* — Joseph P Hirl
*Assistant Examiner* — Thomas A Gyorfi
(74) *Attorney, Agent, or Firm* — Jones Day

(57) ABSTRACT

An artefact is received. Features are later extracted from the artefact and are used to populate a vector. The vector is input into a classification model to generate a score. This score is then modified using a time-based oscillation function and is provided to a consuming application or process. Related apparatus, systems, techniques and articles are also described.

20 Claims, 4 Drawing Sheets

MACHINE LEARNING MODEL SCORE OBFUSCATION USING TIME-BASED SCORE OSCILLATIONS

TECHNICAL FIELD

The subject matter described herein is directed to techniques for obfuscating the output of machine learning models using time-based score oscillations.

BACKGROUND

Machine learning and other types of artificial intelligence models are being increasingly deployed across different applications and industries. Such models provide classifications which can be based, for example, on historical data with known outcomes or features. The classifications provided by such models (i.e., the model outputs, etc.) can take various forms including a Boolean output (e.g., good/bad, etc.), a numerical score (e.g., 0.00 to 1, 1 to 100, etc.), or a grouping (e.g., automobile, pedestrian, crosswalk, etc.). With some software implementations, the outputs of such models can be intercepted even when part of a larger workflow. Such interception can allow a malicious actor to manipulate the classification by such models by repeatedly providing sample input data until a desired classification is received (even if such classification is not ultimately accurate).

SUMMARY

In one aspect, an artefact is received. Features are later extracted from the artefact and are used to populate a vector. The vector is input into a classification model to generate a score. This score is then modified using a time-based oscillation function and is provided to a consuming application or process.

The features in the vector can be reduced prior to the vector being input into the classification model. For example, the features can be reduced using random projection matrices, principal component analysis, and the like.

The classification model can be a machine learning model trained using a training data set and providing a continuous scale output. The classification model can characterize the artefact as being malicious or benign to access, execute, or continue to execute. Access or execution of the artefact can be prevented when the classification model characterizes the artefact as being malicious.

The time-based oscillation function include a combination of simpler periodic functions. The time-based oscillation function can be bounded by maximum and minimum values. The time-based oscillation function can include attenuation to bound the magnitude of the generated noise.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for obfuscating the output of an AI/machine learning model. Such obfuscation is particularly important for applications such as malware detection as it prevents a malicious actor from iteratively modifying a malicious file or code until such time that the model classifies such file or code as being safe to execute or otherwise access.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to techniques for obfuscating an output of a software-based classifier. The classifier in this regard can be an AI/machine learning model that outputs at least one value that characterizes the input to such model. While the current subject matter provides examples relating to models used for detection of malicious software ("malware"), it will be appreciated that the current subject matter can, unless otherwise specified, apply to other applications/workflows utilizing a model including, for example, autonomous vehicle navigation systems, image analysis systems, biometric security systems, video game cheat circumvention systems, and the like.

In some cases, the output of a classification model can be intercepted and exploited by a malicious actor as part of an adversarial attack. For example, data exchanged between a client and a remote server executing the classification model can be accessed such that small changes can be made to the data (e.g., file, code, artifact, etc.) input into the classification model until a desired outcome (from the point of view of the malicious actor) is obtained. For example, a malicious actor either automatically or through manual modifications can make small changes to a file encapsulating malicious code until such time that classification model determines that such file is safe to execute or otherwise access.

Figure 1:
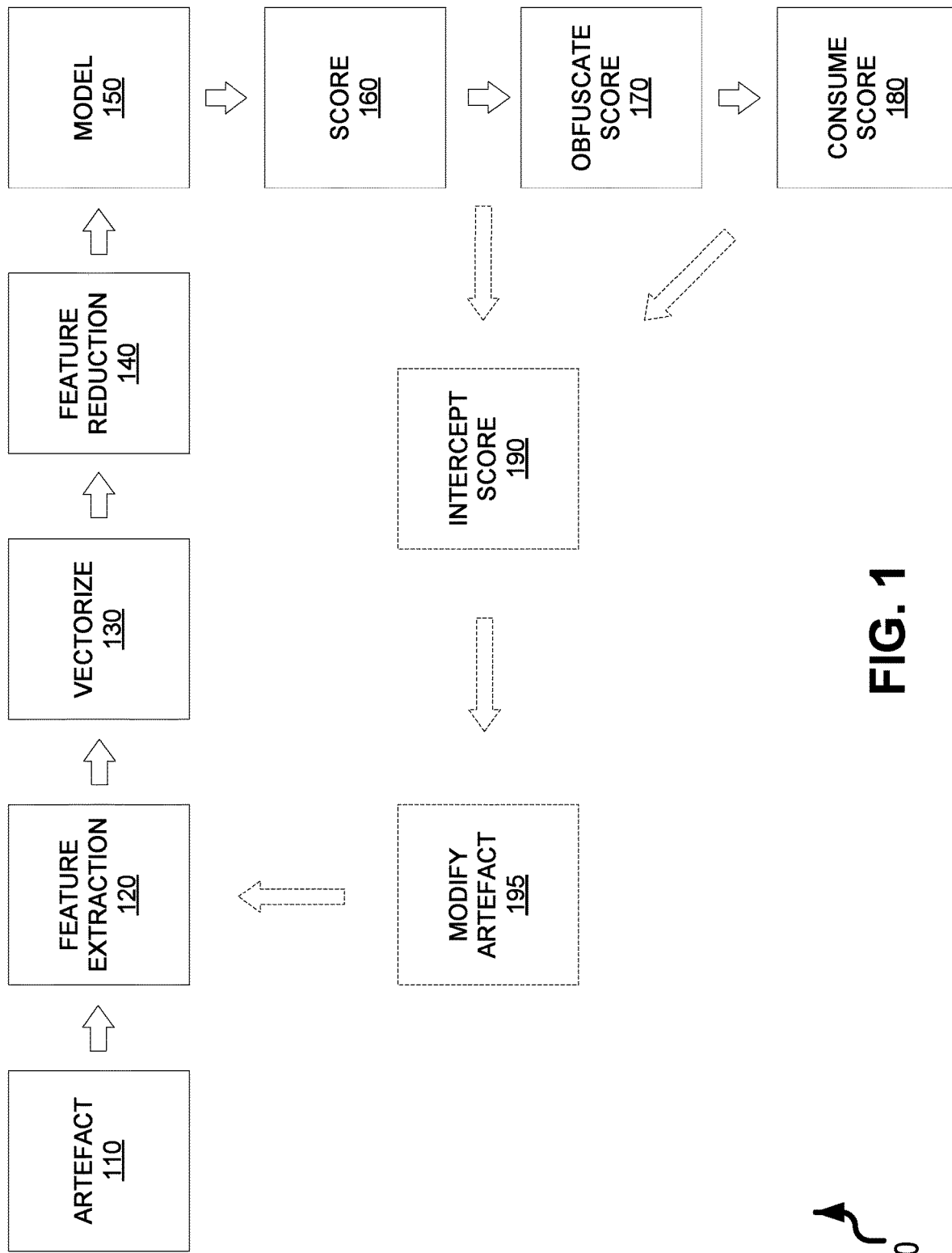
FIG. 1 is a process flow diagram illustrating a first computer-implemented workflow for obfuscating a score from a classification model.

FIG. 1 is a process flow diagram 100 illustrating a sample computer-implemented workflow for use with the current techniques for score obfuscation. Initially, an artefact 110 can be received (e.g., accessed, loaded, received from a remote computing system, etc.). The artefact 110 can be a file, a portion of a file, metadata characterizing a file, and/or source code. This artefact 110 can be parsed or otherwise processed by an observer. In particular, the observer can extract 120 features (sometimes referred to as attributes or observations) from the artefact and vectorize 130 such features. Further, depending on the complexity and/or quantity of features within a vector, a feature reduction operation 140 can be performed on the vector which reduces an amount of dimensions of such vector. The feature reduction operation 140 can utilize various techniques including, but not limited to, principal component analysis and random projection matrices to reduce the number of extracted features within the vector while, at the same time, remaining useful (i.e., for classification purposes, etc.) when input into the classification model 150. The classification model 150 can take many forms including, without limitation, a logistic regression model, a neural network (including concurrent neural networks, recurrent neural networks, generative adversarial networks, etc.), a support vector machine, a random forest, a Bayesian model, and the like. The output of the classification model 150 can be a score 160 which, as described in further detail below, can be obfuscated 170. As used herein, unless otherwise specified, the score can be a numeric value, a classification type or cluster, or other alphanumeric output which, in turn, can be used by a consuming process 180 or application to take some subsequent action. In some variations, the entity consuming the score, at 180, is provided with the utilized time-based oscillation function so that the underlying score can be determined (i.e., reverse engineered, etc.). In some variations, the obfuscated score can be consumed directly by the entity consuming the score at 180. In other variations, a de-obfuscation function can be provided to the consumer to correctly interpret the true score. For malware applications, the score can be used to determine whether or not to access, execute, continue to execute, quarantine, or take some other remedial action which would prevent a software and/or computing system from being infected or otherwise infiltrated by malicious code or other information encapsulated within the artefact 170.

FIG. 1 further illustrates the interception of the score 190. Such interception can occur, for example, when the API of the consuming application is known; by dumping DLL/SO exports with link, nm, obj dump; by using various reverse-compilers; by observing stack/heap/registers during execution for function-calling behavior, and the like. Other API (i.e., function)-discovering techniques can also be used.

In an arrangement in which the output of the model 150 can be readily ascertained (e.g., a single model 150 arrangement without score obfuscation), the score 160 can be used by a malicious actor to modify the artefact 195 and repeat the process until such time that a desired score 160 by the corresponding model 150. For example, the modified artefact 195 can encapsulate malicious script and small changes to the artefact 110 could result in the corresponding classification model 150 classifying such modified artefact 195 as being benign.

Modifications to an artefact 150 can be done in such a way as to maintain the original character or nature of the artefact 150. In the example of an actor attempting to modify a malicious file (malware), any modifications must be such that the malware still operates as intended. Such modifications can be made by (for instance) adding to, removing from, or altering un-used portions of the malicious file. As these portions of the file are unused, they have no effect on the realized behavior of the file, but may result in a different score 160 from the model 150. Alternatively or additionally, used sections of the artefact 150 can also be modified, so long as the final function of the malware is left intact.

Whether manually, or in an automated system, the actor or system will typically make many small changes, and get new scores 160 from the model 150. Any change that moved the score 160 in the desired direction (i.e. in the malware example, moving the score closer to a value that is interpreted as benign) is maintained, while other changes are discarded. Such an iterative process can be repeated until the cumulative changes to the artefact 110 result in a cumulative change in the score 150 which accomplishes the desired effect. The obfuscation techniques provided herein can interrupt this cycle of iterative improvements by masking the true effect of each change to an artefact 110 with a false or misleading change in the score 160 which is determined by the obfuscation techniques herein.

Figure 2:
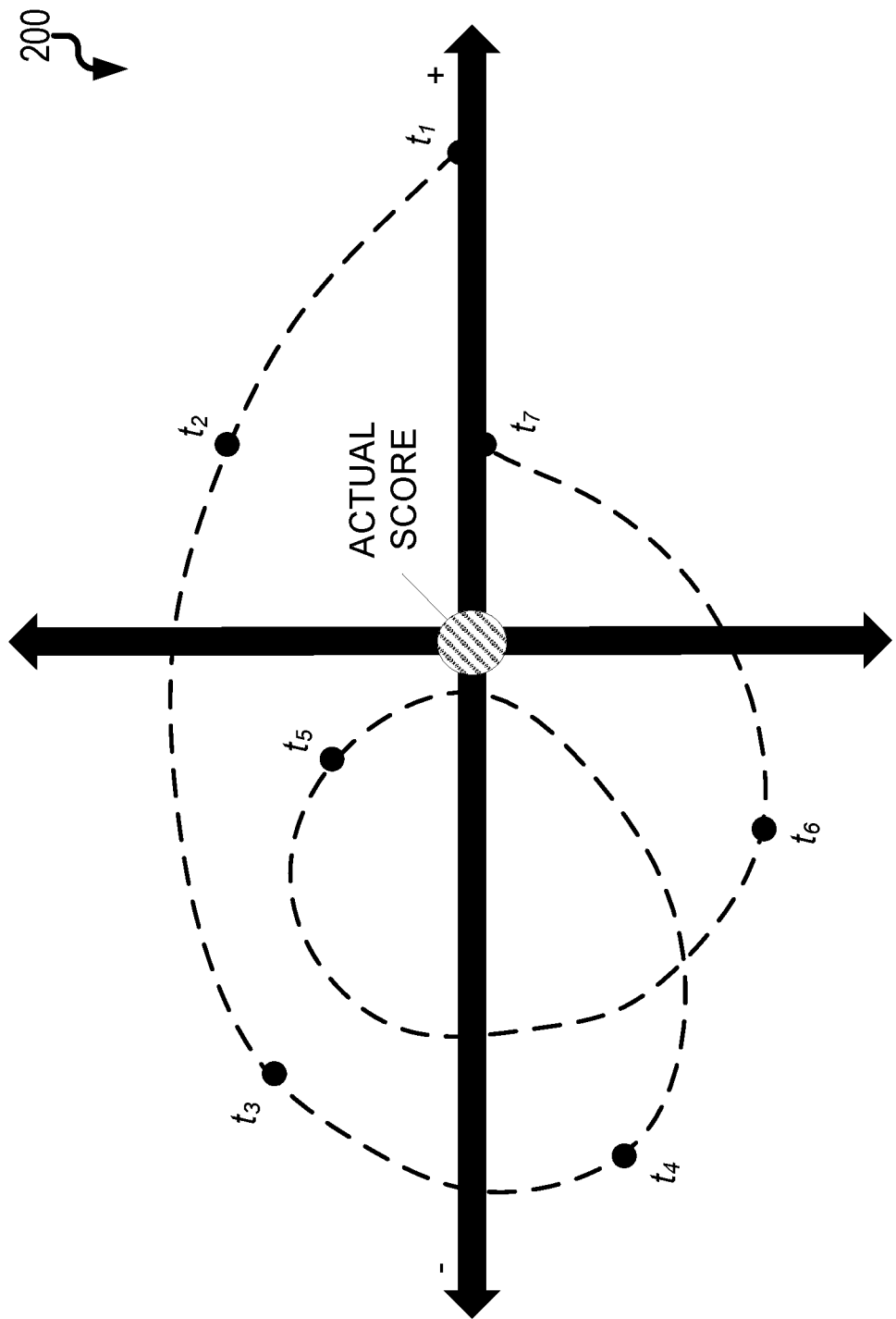
FIG. 2 is a diagram illustrating an example of obfuscating a score from a classification model using time-based score oscillations.

The score obfuscation, at 170, causes the output score to be changed to a new value. FIG. 2 is a diagram 200 illustrating the application of a time-based oscillation function to obscure the score 160. In this particular example, the actual score is represented at the intersection of the two axes. The time-based oscillation function causes the obfuscated score 170 (of the exact same score 160) to have different values depending on when such score has been generated ($t_1 \ldots t_7$). With this arrangement, the time-based changes to the score may mislead the adversary into believing that the changes they had made to the input were the cause, especially when such a change to the input yielded no change in the true model. In this way, the adversary may aim to continue making changes to the artifact which are ineffective at changing the true model score. Additionally, small changes to the input to the model which would normally yield small changes to the true score may become untrackable, as the score itself constantly changes; and repeating the same change may yield a slightly different result. Automated systems used by the adversary may follow the periodic noise indefinitely, while very rarely, if ever, finding a desirable artifact change.

Any periodic function, or combination of periodic functions can be used to create the noise in the score obfuscation function 170. Examples of periodic functions include, but are not limited to, any trigonometric function, trochoid or cycloid functions, square wave functions, sawtooth functions, triangle wave functions, and the like.

Example Noise Function 1: An illustrative example of a noise function based on trigonometric functions is: noise (time)=A*sin(B*time)+C*cos(D*time). A, B, C, and D are constants chosen by the implementer, which adjust the rate at which the noise changes given a certain elapsed time, and the magnitude of the noise produced. This noise value would be added to the true score to create the obfuscated score. It is important to note that this method does not include a method to ensure that the true score and the obfuscated score fall in the same classification range (i.e. if the boundary between classes is 0, one may be negative while the other is positive). In this case, the consumer must also have the noise creation function, and be provided the time used by the obfuscation function to produce the noise.

Example Noise Function 2: To ensure that the noise function does not produce values that would cause the obfuscated score to be interpreted as the wrong class (as described above), an attenuation function can be added to the noise function. For instance, a maximum and minimum allowable noise could be passed to the noise function, such that if the noise function would otherwise exceed the maximum or fall beneath the minimum, that the maximum or minimum itself would be returned, respectively.

Another example of an attenuation function could be a parameterized logistic function. Such a function can be parameterized such that when the true score is near a class boundary, the maximum value of the noise is likewise reduced. For instance: noise(time, D)=logistic_function(D, theta)*periodic_function(time), where D is the distance between the true score and the nearest class boundary, theta are parameters for the logistic function, and "periodic_function" is any such periodic function as described herein. It is useful to choose parameters for the logistic function such that when D approaches zero, the overall value of the logistic function also approaches zero, and hence reduces the final noise toward zero as well. The range over which the logistic function provides meaningful noise attenuation is chosen by the implementer.

The unit of measurement of time can determine how much time would elapse before the score would change due to the noise function. For instance, if time was measured in seconds, then two measurements of the score of an artefact within a fraction of a second would often produce the same score. The implementer would choose the unit of time such that the score changed as quickly or as slowly as desired. In some cases, it may be desirable to hold the score steady for a short period of time, to mislead the adversary into thinking none of the changes to the artefact have successfully affected the model score. Then, when the score did change due to the advancement of time, the adversary might be further misled into believing that whichever change they had most recently made was a particular effective change, and might try to make more of those types of changes, though in reality, there may be no particular relationship with the true score.

Utilizing complex time-based oscillation functions is advantageous in that it makes it more difficult to reverse engineer. The oscillating noise can affect all artifacts 110 in a manner such that repeated sequence of score measurements do not appear to have a trend. The period of oscillation ideally is not an integer so that exact repeat scores are not generated.

In some of the example methods described above, the ultimate classification of the obfuscated scores 170 are maintained. In others, the application of the noise function results in changes in the ultimate classification of the obfuscated score 170 (i.e., a positive score 160 can be obfuscated so that it is negative, etc.). When this is the case, the time used by the obfuscation method would have to be known by or provided to the score consumer, which can then be used to re-calculate the noise and subtract it from the obfuscated score, thereby yielding the true score. This de-obfuscation is only necessary when the classification derived from the obfuscated score can be different from that derived from the true score. De-obfuscation can also be used when this is not the case but will not affect the classifications derived from the de-obfuscated score.

Figure 3:
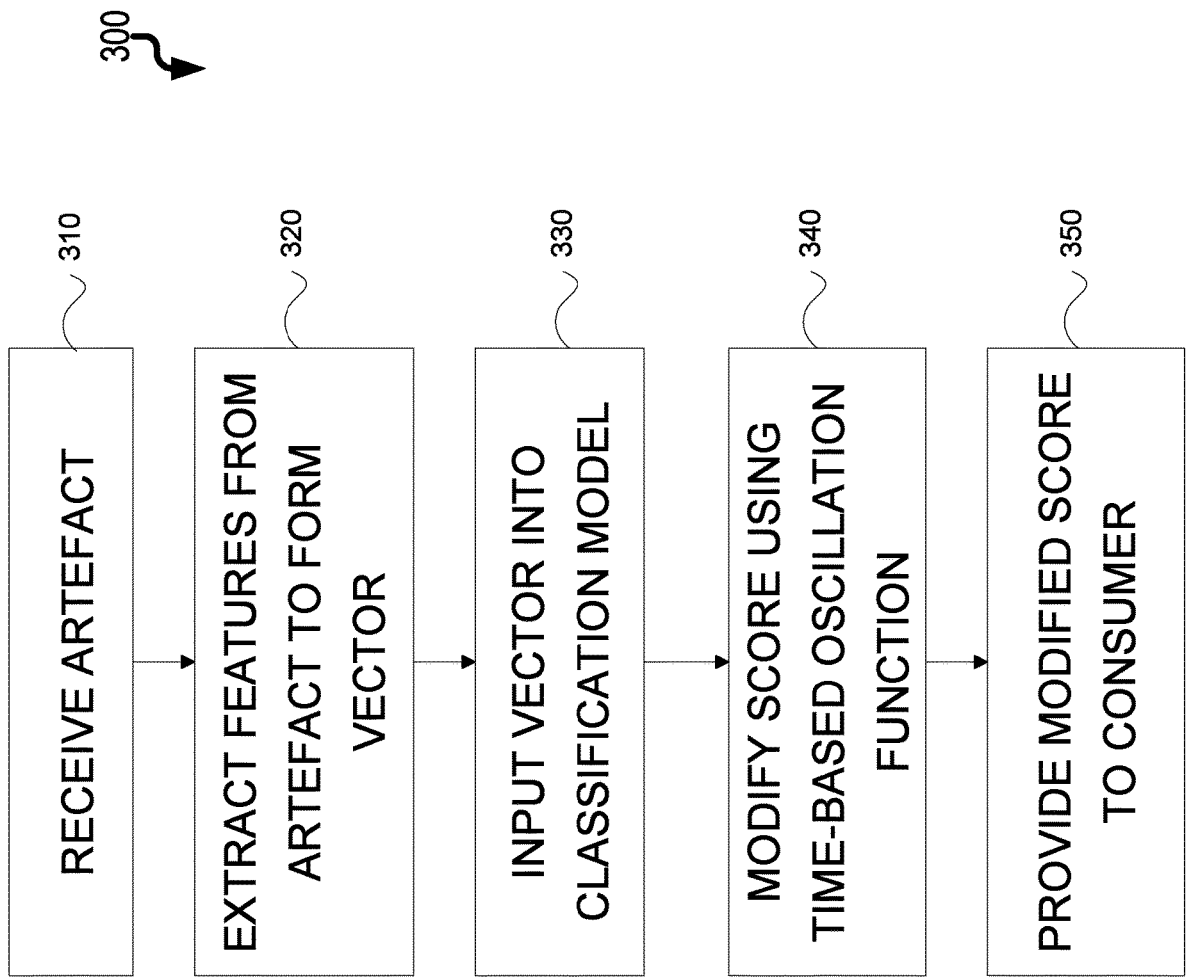
FIG. 3 is a process flow diagram illustrating a second computer-implemented workflow for obfuscating a score from a classification model.

FIG. 3 is a process flow diagram in which, at 310, an artefact is received. Thereafter, at 320, features are extracted from the artefact so that a vector can be populated with such features. Next, at 330, the vector is input into a classification model to generate a score. This score is modified, at 340, using a time-based oscillation function to obfuscate its actual value. Therefore, the modified score is provided, at 350, to a consuming application or process. For example, the consuming application or process can use such score to make a determination of whether or not to access, execute, or continue to execute the artefact (i.e., it can be used to prevent malware from infiltrating a computing and/or software system, etc.).

Figure 4:
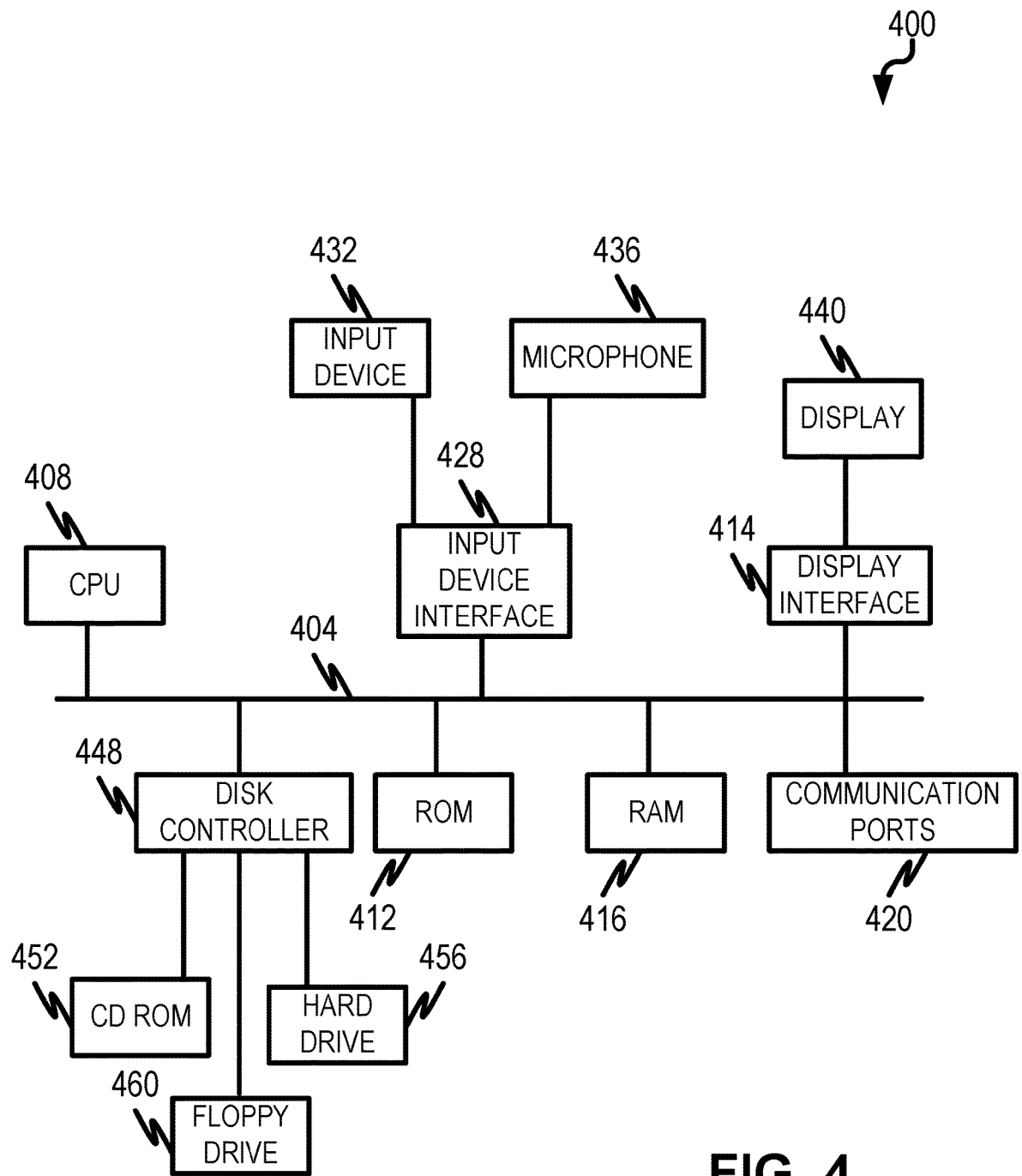
FIG. 4 is a diagram illustrating a computing device that can be used to implement aspects of the current subject matter.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers/processor cores, etc., can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface with one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for obfuscating an output of a classification model comprising:
   receiving an artefact;
   extracting features from the artefact and populating a vector;
   inputting the vector into a classification model to generate a score;
   modifying the score using a time-based oscillation function that causes the generated score to have different values depending on a time when such score has been generated; and
   providing the modified score to a consuming application or process.

2. The method of claim 1 further comprising reducing features in the vector prior to the inputting into the classification model.

3. The method of claim 2, wherein the features are reduced using random projection matrices.

4. The method of claim 2, wherein the features are reduced using principal component analysis.

5. The method of claim 1, wherein the classification model is a machine learning model trained using a training data set and providing a continuous scale output.

6. The method of claim 1, wherein the classification model characterizes the artefact as being malicious or benign to access, execute, or continue to execute.

7. The method of claim 6 further comprising: preventing access or execution of the artefact when the classification model characterizes the artefact as being malicious.

8. The method of claim 1, wherein the time-based oscillation function is made of a combination of simpler periodic functions.

9. The method of claim 1, wherein the time-based oscillation function is bounded by maximum and minimum values.

10. The method of claim 1, wherein the time-based oscillation function includes attenuation to bound the magnitude of the generated noise.

11. A system for obfuscating an output of a classification model comprising:
    at least one data processor; and
    memory storing instructions which, when executed by the at least one data processor, result in operations comprising:
       receiving an artefact;
       extracting features from the artefact and populating a vector;

inputting the vector into a classification model to generate a score;
modifying the score using a time-based oscillation function that causes the generated score to have different values depending on a time when such score has been generated; and
providing the modified score to a consuming application or process.

12. The system of claim 11, wherein the operations further comprise: comprising reducing features in the vector prior to the inputting into the classification model.

13. The system of claim 12, wherein the features are reduced using random projection matrices.

14. The system of claim 12, wherein the features are reduced using principal component analysis.

15. The system of claim 11, wherein the classification model is a machine learning model trained using a training data set and providing a continuous scale output.

16. The system of claim 11, wherein the classification model characterizes the artefact as being malicious or benign to access, execute, or continue to execute.

17. The system of claim 16 further comprising: preventing access or execution of the artefact when the classification model characterizes the artefact as being malicious.

18. The system of claim 11, wherein the time-based oscillation function is made of a combination of simpler periodic functions.

19. The system of claim 11, wherein the time-based oscillation function is bounded by maximum and minimum values.

20. The system of claim 11, wherein the time-based oscillation function includes attenuation to bound the magnitude of the generated noise.

* * * * *